United States Patent [19]

Pradon

[11] 4,142,623
[45] Mar. 6, 1979

[54] CONVEYOR FOR CYLINDRICAL CONTAINERS

[75] Inventor: Jacques Pradon, St.-Maur-des-Fosses, France

[73] Assignee: ERMI, Paris, France

[21] Appl. No.: 797,315

[22] Filed: May 16, 1977

[30] Foreign Application Priority Data

Jun. 11, 1976 [FR] France .............................. 76 17711

[51] Int. Cl.² .................... B65G 47/24; B65G 47/84
[52] U.S. Cl. .................................. 198/410; 198/576; 198/654; 198/835
[58] Field of Search ............... 198/373, 475, 405, 406, 198/410, 476, 576, 604, 605, 626, 648, 653, 654, 655, 645, 793, 832, 835, 839, 840, 411, 412; 214/300, 309, 311; 134/70, 71, 72, 73, 75, 67, 82, 83, 124, 125, 127

[56] References Cited

U.S. PATENT DOCUMENTS

| | | | |
|---|---|---|---|
| 2,435,694 | 2/1948 | Pearson | 198/835 |
| 2,455,175 | 11/1948 | Hohl | 198/626 X |
| 2,493,837 | 1/1950 | Smith | 214/311 X |
| 3,032,171 | 5/1962 | Petin | 198/482 |
| 3,211,275 | 10/1965 | Van der Winden | 198/645 |
| 3,513,963 | 5/1970 | Witte | 198/645 |
| 3,797,632 | 3/1974 | Riggs | 198/653 X |
| 4,008,801 | 2/1977 | Reilly et al. | 198/840 X |

*Primary Examiner*—Robert B. Reeves
*Assistant Examiner*—James L. Rowland
*Attorney, Agent, or Firm*—Haseltine, Lake & Waters

[57] ABSTRACT

A conveyor for conveying generally cylindrical containers having an opening at one end and closed at the other end, the conveyor comprising an endless belt provided with flanges for engagement by driving and guiding pulleys and container-supporting elements attached to the belt at regular intervals therealong. Each supporting element includes at least one portion forming a partition extending transversely of the belt and at least one portion forming a bearing for the closed end of the container, the bearing portion extending perpendicular to the belt and parallel with the edges of the belt. The supporting elements forming with the belt a succession of seatings for receiving containers which will be maintained in place when the belt is vertical or inclined to tilt the supporting elements upwardly.

4 Claims, 8 Drawing Figures

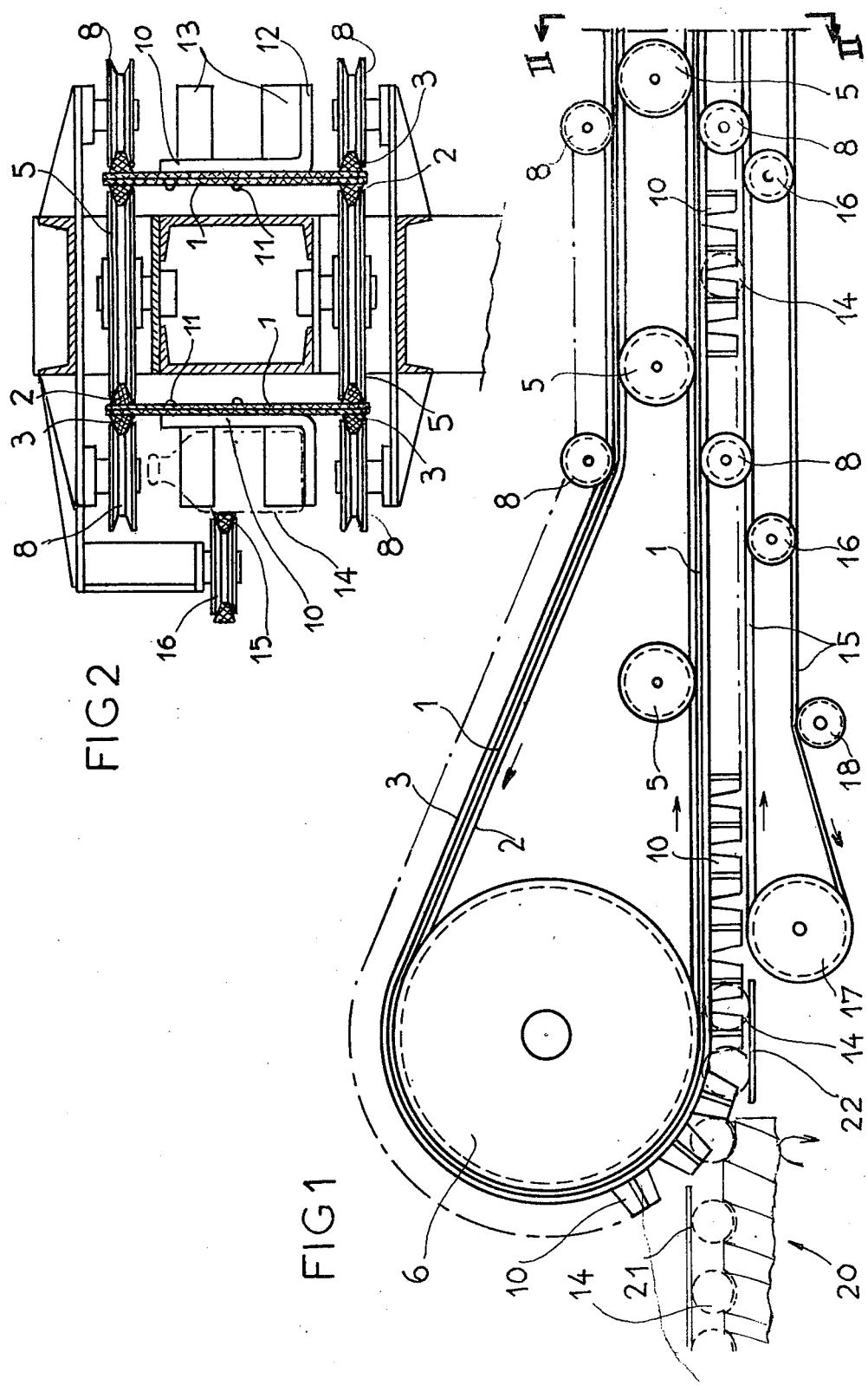

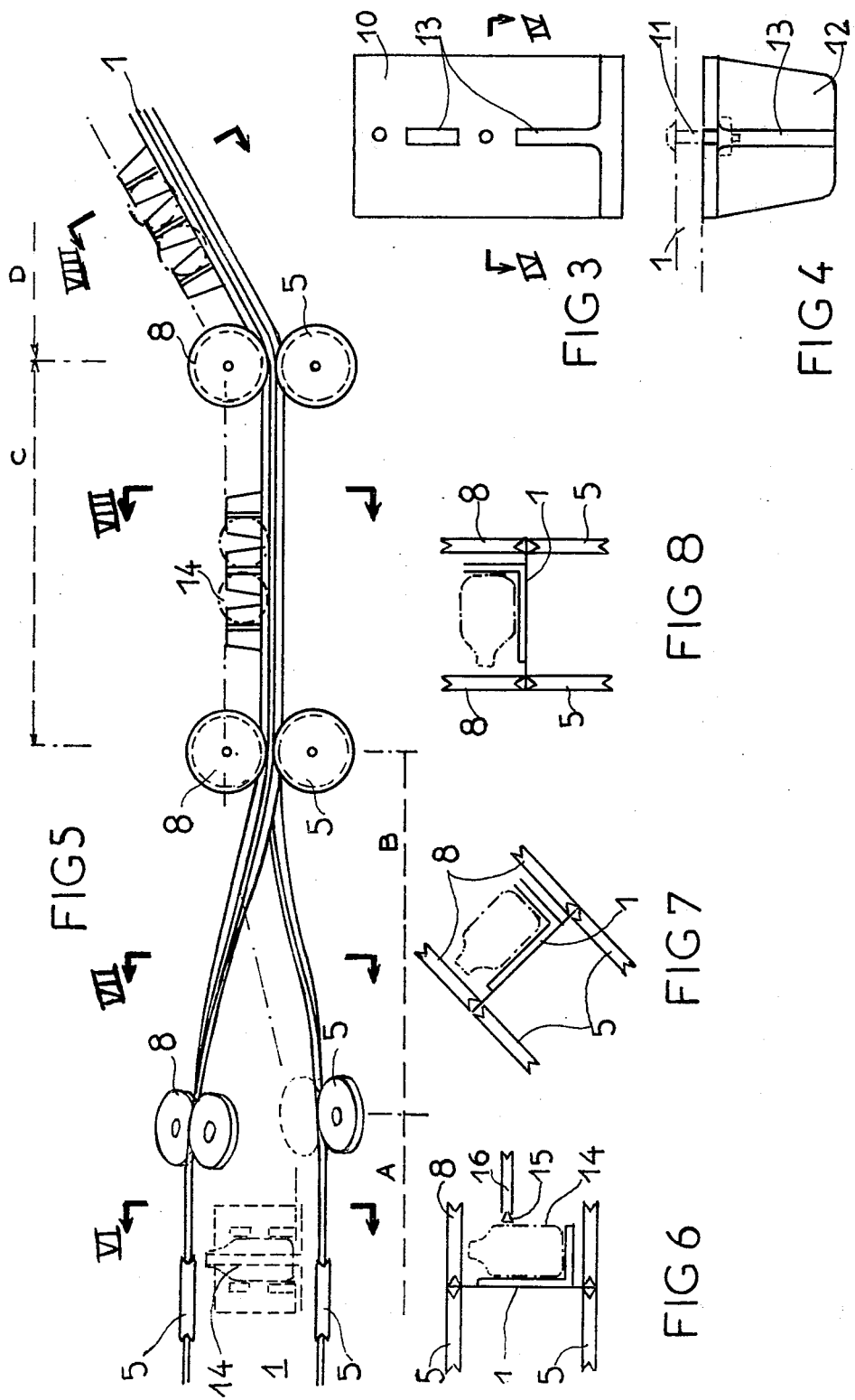

CONVEYOR FOR CYLINDRICAL CONTAINERS

FIELD OF THE INVENTION

The present invention relates to a conveyor for cylindrical containers, for example for handling bottles between high speed automatic machines such as filling, labelling machines and the like.

PRIOR ART

Numerous industries and particularly the food industry employ very-high-rate automatic machines which form the elements in a more complex production chain such as a bottling chain. Such chains pose serious conveyance problems: first of all for feeding the first machine upstream with bottles, usually brought on pallets, and then to bring the bottles from one machine to the next.

In current installations belt conveyors are generally employed. The bottles are arranged upright on the belt and are carried along between two sideguides. The bottles which are nearly contiguous on the belt can knock together and rub continuously against the guides. The result is that the speed of conveyance is restricted by the risk of increasing breakage by increasing violence of impact and accelerated wear of the bottles by friction. Finally, even at relatively low speeds the noise of bottles knocking together and against the guides quickly renders working conditions unbearable. Under these present day conditions it is more often than not the feed and connecting conveyors between machines which limit the production rate, the machines themselves often being capable of dealing with bottles at rates reaching 40 per second.

In addition, such conveyors enable changes of level only at very slight slopes, with the result that in order to reduce the size of complex chains one is often obliged to incorporate between the conveyors supplementary lifting or lowering devices. As a result, secondary transfers of bottles from one device to another takes place, which again adds to the wear on the bottles and the total noise of the plant.

SUMMARY OF THE INVENTION

In accordance with the invention there is provided a conveyor for conveying containers of generally cylindrical shape which are closed at one end and have an opening at the other end, the conveyor comprising:
  an endless belt;
  flange means on said belt for engagement with pulley means; and
  supporting elements attached at regular intervals to said body of the belt, each said supporting element including at least one portion forming a partition extending transversely of said belt and at least one portion forming a bearing for the closed end of a container, said bearing portion extending perpendicular to said belt and parallel with the edges of said belt, said supporting elements on said belt forming a succession of seatings each for receiving a container, which container will be maintained in place when said body of said belt is vertical or inclined towards the face thereof opposite from said supporting elements.

In a preferred embodiment of the invention each supporting element includes a portion forming a single central partition and a portion forming a bearing of generally trapezoidal shape which is divided into two parts by said central partition, each container seating being then formed by the two facing halves of two consecutive ones of said supporting elements.

BRIEF DESCRIPTION OF THE DRAWINGS

The invention will be more fully understood from the following description of an embodiment thereof, given by way of example only, with reference to the accompanying drawings.

In the drawings:

FIG. 1 is a simplified plan view of a running portion and of the head of an embodiment of a conveyor in accordance with the invention for conveying bottles with its feeder device;

FIG. 2 is a more complete section of a running portion, taken along line II—II in FIG. 1;

FIGS. 3 and 4 show a detail on a larger scale of a supporting element. FIG. 3 is a front elevation view; FIG. 4 is a section taken along line IV—IV in FIG. 3; and FIGS. 5 to 8 illustrate in a simplified fashion the employment of the conveyor in an installation with change of level. FIG. 5 represents in elevation a number of zones of the conveyor at different inclinations of the belt. FIGS. 6, 7 and 8 are respectively simplified diagrammatic sections taken along lines VI, VII and VIII in FIG. 5.

DETAILED DESCRIPTION

Reference will first be made to FIGS. 1 to 4. For simplification and better understanding of the drawing, FIG. 1 shows solely the belts and the relative positions of the various supporting or driving pulleys of the conveyor. It does not show the frames or various supports of the conveyor; these are seen in FIG. 2, but as they consist of ordinary skeleton elements they will not be described in detail.

The conveyor comprises an endless belt 1 with internal reinforcement ensuring good transverse rigidity and low elongation under tension. The belt is equipped at each of its two edges with flanges 2 and 3 of trapezoidal shape. The belt is supported inside the closed loop by pulleys 5 or drums 6 having trapezoidal grooves in which engage the inner flanges 2 at each edge. Of course, depending upon the requirements of the installation one or other of the end drums 6 will be driven and certain of the intermediate pulleys 5 may also be driven, the driving mechanisms being well known. In order to reduce the transverse size of the conveyor, it is seen that in the running portions the same pulleys 5 support or drive both sides of the belt. In the straight portions or in order to bring the belt back towards the pulleys 5 the belt is supported in addition by counterpulleys 8, likewise having trapezoidal grooves in which engage the outer flanges 3 at each edge.

Supporting elements 10 are bolted at 11 at regular intervals to the body of the belt 1. Each element 10, seen from the front in FIG. 3 and in profile in FIG. 2, is, for example, of molded plastic material and generally of right-angled elbow shape fitted to the belt by its long arm. The other arm 12 is of trapezoidal shape and constitutes a bearing member perpendicular to the belt and parallel with the edges thereof. Each member 12 is divided in two by a central partition 13. It can be seen that two facing half-portions of two consecutive elements 10 form a seating for receiving a bottle 14 in the position shown in dash-dot lines in FIGS. 1 and 2. In these two Figures in which the body of the belt 1 is vertical, each bottle rests upon two half bearing members 12 and is held between two partitions 13. The bottle is trapped in its seating by an auxiliarly endless retainer-belt 15 guided and driven parallel with the belt 1 by grooved pulleys 16 and 17 and counter-pulleys such as 18.

The pitch of the supporting elements 10 along the belt 1 is determined so as to leave between two consecutive partitions 13, when the belt is in a straight line, a gap just a little larger than the diameter of a bottle. When the belt passes round an end-drum 6 the partitions adopt a radial position which slightly opens the seating formed and facilitates the introduction of bottles into the conveyor. In the lefthand portion of FIG. 1 can be seen a screw-device particularly suited to feeding the conveyor. Here, and in the usual way, the bottles 14 have been brought from an upstream position in single file from a table for progressive closing-up between guides. The bottles being substantially contiguous are taken one by one into the hollows of a screw 20, in which they are held by a guide 21. The screw 20 has a progressively increasing pitch, which progressively accelerates each bottle, separating it from the next and thus giving the bottles a spacing corresponding with the pitch of the supports 10 on the chain. By synchronization of the screw 20 and the driving mechanisms of the conveyor a bottle is thus brought opposite each seating on the conveyor. The bottles are initially guided over a short distance by a fixed guide 22 until the belt 1 is brought into a straight line, bringing the supports 10 into the normal position with the bottles retained by the moving auxiliarly belt 15. In order to take maximum advantage of the possibilities of high speed of the conveyor, two feedlines can be provided, each filling every other seating on the conveyor. In known fashion, an intermediate feed drum may also be employed. A similar device may be provided to enable withdrawal of the bottles at the other end of the conveyor.

It will be observed that in the conveyor described above each bottle is "carried" individually without contact with its neighbors and without rubbing against fixed parts in relative motion. The causes of noise and wear are thus considerably reduced, which allows increased speeds of movement compatible with the maximum rates of the machines which the conveyor feeds.

The portions of the path where the auxiliary retainer-belts 15 are necessary may be reduced by tilting the belt 1 sideways, for example, at 45°, the supports 10 being then on the upper face and tilted upwardly. The bottles will then be supported by gravity in each seating without the need of supplementary retention. This can easily be obtained by progressively inclining the axes of successive groups of guide pulleys 5 and 8. In addition, it then becomes possible to change both the level and the orientation of the conveyor by turning the belt, for example, about an axis inclined at 45° and arranged parallel with the plane of the belt.

Changes of level may be obtained along still steeper slopes by bringing the body of the belt nearly horizontal and making it turn about a nearly horizontal axis, a slight residual inclination of the belt possibly being necessary to keep the bottles bearing against the bottom of the seatings. FIGS. 5 to 8 show such an arrangement. In FIG. 5, starting from a zone A where the body of the belt 1 is vertical and retainer belts 15 (shown only in FIG. 6) are provided, the body of the belt is tilted in the zone B by tilting of the pulleys 5 and 8 until it is horizontal in the zone C of its path. The belt may then be inclined in the zone D for a rapid change of level with the bottles remaining in their seatings. Reverse tilting of the belt at the upper level will enable the body of the belt 1 to be restored to the vertical position at the delivery station of the conveyor, the bottles being then discharged in the vertical position. Of course the last portion of the path will again include a retainer belt 15.

The invention is not intended to be strictly confined to the embodiment described above by way of example only, but also covers embodiments which differ from it only in detail, in variants upon the execution or in the employment of equivalent means. Thus supports 10 may be provided having two partitions forming a one piece seating; such an arrangement, being less convenient for feeding to or delivery from the conveyor on the horizontal onto a counterdrum, might in certain cases facilitate feeding from the top or in a path in a straight line.

It will be appreciated that the invention is applicable not only to the conveyance of bottles but to the conveyance of any containers of generally cylindrical shape which are open at the end, such as glasses or jars and even metal cans to reduce handling noise.

There is thus provided a conveyor which is capable of higher speeds of movement while reducing risks of breakage and which in addition enables movements with change of level at relatively steep slopes.

What is claimed is:

1. An installation for the transfer of containers of generally cylindrical shape which are closed at one end and open at the other end, said installation comprising
    a conveyor including an endless traveling belt having a loading zone, flange means on said belt, pulley means engageable with said flange means during travel of the belt, said pulley means including guide pulleys and drive pulleys for guiding and driving the belt, supporting elements attached at regular intervals to said belt, each said supporting element including at least one portion forming a partition extending transversely of said belt and at least one portion forming a bearing for the closed end of a container, said bearing portion extending perpendicular to said belt and parallel to the edges of said belt, said supporting elements on said belt forming a succession of seatings each for receiving a container, which container will be maintained in place when said belt is vertical or is inclined so that the seatings are tilted upwardly,
    means for introducing containers onto said seatings on the belt at said loading zone in synchronism with the movement of the conveyor,
    an endless retainer belt extending adjacent said conveyor belt over a portion of the path of travel thereof for retaining the containers in said seatings, said endless retainer belt being driven at the same linear speed as said conveyor belt, further pulley means engaging said retainer belt for urging the same against the containers in said seatings on the conveyor belt,
    said conveyor belt extending vertically in the position of travel thereof adjacent said retainer belt,
    said guide pulleys in the path of travel of said conveyor belt outside the portion adjacent the retainer belt being arranged to tilt said conveyor belt such that the supporting elements are tilted upwardly.

2. A conveyor as claimed in claim 1 wherein in said path of travel of the conveyor belt in which the belt is tilted, said guide pulleys are arranged to change the level of the conveyor belt.

3. A conveyor as claimed in claim 2 wherein said guide pulleys which change the level of the conveyor belt are oriented to turn the belt about an axis parallel to the plane of the belt.

4. A conveyor as claimed in claim 1 wherein said retainer belt is located in the vicinity of said loading zone and said belt is tilted downstream of said loading zone.

* * * * *